(12) United States Patent
Belling

(10) Patent No.: US 11,310,293 B2
(45) Date of Patent: Apr. 19, 2022

(54) ENHANCED MEDIA PLANE OPTIMIZATION IN WEB REAL TIME COMMUNICATION SCENARIOS

(71) Applicant: NOKIA SOLUTIONS AND NETWORKS OY, Espoo (FI)

(72) Inventor: Thomas Belling, Erding (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/774,097

(22) PCT Filed: Nov. 9, 2015

(86) PCT No.: PCT/EP2015/076055
§ 371 (c)(1),
(2) Date: May 7, 2018

(87) PCT Pub. No.: WO2017/080574
PCT Pub. Date: May 18, 2017

(65) Prior Publication Data
US 2018/0316732 A1    Nov. 1, 2018

(51) Int. Cl.
*H04L 29/06* (2006.01)
*H04L 65/1089* (2022.01)
(Continued)

(52) U.S. Cl.
CPC ........ *H04L 65/1089* (2013.01); *H04L 65/105* (2013.01); *H04L 65/1006* (2013.01);
(Continued)

(58) Field of Classification Search
CPC ............... H04L 65/1089; H04L 65/105; H04L 65/1069; H04L 65/608
See application file for complete search history.

(56) References Cited

U.S. PATENT DOCUMENTS 10,356,141 B2 *  7/2019  Wang ................ H04L 65/403
2009/0010217 A1 *  1/2009  Belling ............. H04L 29/06027
                                                             370/329
(Continued)

FOREIGN PATENT DOCUMENTS

CN    101278278 A    10/2008
CN    101924772 A    12/2010
(Continued)

OTHER PUBLICATIONS

C. Holmberg Ericsson et al., "Negotiating Media Multiplexing Using the Session Description Protocol (SD)," Jul. 20, 2015. (Year: 2015).*

(Continued)

*Primary Examiner* — Andrew C Georgandellis
(74) *Attorney, Agent, or Firm* — Squire Patton Boggs (US) LLP

(57) ABSTRACT

Enhanced media plane optimization in web real time communication scenarios There are provided measures for enhanced media plane optimization in web real time communication scenarios. Such measures exemplarily comprise receiving a first session description message comprising at least one media line indicative of multiple media streams transportable in a same stream control association, and generating, based on said first session description message, a second session description message indicative of a possibility for a separate transport of said multiple media streams and of a possibility for a joint transport of at least some media streams of said multiple media streams in the same stream control association.

6 Claims, 15 Drawing Sheets

(51) Int. Cl.
  *H04L 65/1045* (2022.01)
  *H04L 65/1069* (2022.01)
  *H04L 65/1096* (2022.01)
  *H04L 65/10* (2022.01)
  *H04L 65/65* (2022.01)

(52) U.S. Cl.
  CPC ...... *H04L 65/1069* (2013.01); *H04L 65/1096* (2013.01); *H04L 65/608* (2013.01)

(56) References Cited

U.S. PATENT DOCUMENTS

| | | | | |
|---|---|---|---|---|
| 2010/0205290 | A1* | 8/2010 | Peng | H04L 47/10 709/223 |
| 2011/0040883 | A1 | 2/2011 | Belling | |
| 2016/0277246 | A1* | 9/2016 | Wei | H04L 41/0823 |

FOREIGN PATENT DOCUMENTS

| | | |
|---|---|---|
| CN | 102833698 A | 12/2012 |
| CN | 104683312 A | 6/2015 |
| CN | 103779642 B | 6/2016 |
| CN | 106654495 B | 1/2019 |
| WO | 2015093058 A1 | 6/2015 |

OTHER PUBLICATIONS

Stewart et al., "Stream Control Transmission Protocol," Oct. 2000. (Year: 2000).*
"SCTP Overview," Sep. 17, 2020. (Year: 2020).*
Jun. 20, 2019 Office Action issued in Korean Patent Application No. 10-2018-7016401.
"Universal Mobile Telecommunications System (UMTS); LTE; Web Real-Time Communications (WebRTC) access to the IP Multimedia (IM) Core Network (CN) subsystems (IMS); Stage 3; Protocol specification (3GPP TS 24.371 version 12.3.0 Release 12)", ETSI TS 124 371 V12.3.0 (Oct. 2015).
C. Holmberg et al., "Stream Control Transmission Protocol (SCTP)—Based Media Transport in the Session Description Protocol (SDP)", draft-ietf-mmusic-sctp-sdp-15, Internet—Draft (Sep. 7, 2015).
"AII-IP Core Network Multimedia Domain Service Based Bearer Control—Tx Interface Stage-3", 3GPP2 X.S0013-013-0, Version 1.0 (Dec. 2007).
International Search Report & Written Opinion dated Jul. 25, 2016 corresponding to International Patent Application No. PCT/EP2015/076055.
3GPP TS 24.371 V12.3.0 (Sep. 2015), Technical Specification, 3rd Generation Partnership Project; Technical Specification Group Core Network and Terminals; Web Real-Time Communications (WebRTC) access to the IP Multimedia (IM) Core Network (CN) subsystem (IMS); Stage 3; Protocol specification (Release 12), Oct. 1, 2015, XP014265295.
3GPP TS 24.371 V13.1.0 (Sep. 2015), Technical Specification, 3rd Generation Partnership Project; Technical Specification Group Core Network and Terminals; Web Real-Time Communications (WebRTC) access to the IP Multimedia (IM) Core Network (CN) subsystem (IMS); Stage 3; Protocol specification (Release 13), Sep. 23, 2015, pp. 1-32, XP050996230.
Jul. 16, 2019 Office Action issued in Japanese Patent Application No. 2018-523760.
Campbell et al RFC: 4975; The Message Session Relay Protocol (MSRP); 2007.
3GPP TS 23.228 V 13.4.0 (Sep. 2015); 2015; 3rd Generation Partnership Project; Technical Specification Group Services and System Aspects; IP Multimedia Subsystem (IMS);Stage 2(Release 13).
IETF G. Camarillo et al RFC 4582 The Binary Floor Control Protocol (BFCP); 2006.
Sep. 25, 2019 Communication pursuant to Article 94(3) EPC issued in European Patent Application No. 15793775.6.
3GPP TS 24.229 V1 3.3.1 (Sep. 2015), Technical Specification, 3rd Generation Partnership Project; Technical Specification Group Core Network and Terminals; IP Multimedia call control protocol based on Session Initiation Protocol (SIP) and Session Description Protocol (SDP); Stage 3 (Release 13), Sep. 2015.
First Chinese Office Action issued in corresponding Chinese Patent Application No. 201580084452.5, dated Apr. 28, 2020, with English summary thereof.
First Indian Examination Report issued in corresponding Indian Patent Application No. 201817011941, dated Mar. 13, 2020.
Communication pursuant to Article 94(3) EPC dated Oct. 20, 2021 corresponding to European Patent Application No. 15793775.6.

* cited by examiner

ENHANCED MEDIA PLANE OPTIMIZATION IN WEB REAL TIME COMMUNICATION SCENARIOS

FIELD

The present invention relates to enhanced media plane optimization in web real time communication scenarios. More specifically, the present invention exemplarily relates to measures (including methods, apparatuses and computer program products) for realizing enhanced media plane optimization in web real time communication scenarios.

BACKGROUND

The present specification generally relates to transparent transport of media through the internet protocol (IP) multimedia subsystem (IMS) between web real-time communication (WebRTC) IMS clients (WICs). In such scenario, a WIC originates a call (for transport of media), while the other WIC terminates the call (for transport of media). The WIC originating the call accesses the IMS via an enhanced proxy call session control function (eP-CSCF), originating side eP-CSCF, while the WIC terminating the call access the IMS via another eP-CSCF, terminating side eP-CSCF.

Known transparent media formats and procedures related to the field are discussed below. These are in particular known from 3$^{rd}$ generation Partnership Project (3GPP) technical specification (TS) 23.228, from 3GPP TS 24.371 and from 3GPP TS 24.229.

The originating side WIC initiates a call by creating a session description protocol (SDP) offer which is sent to the originating side eP-CSCF. The information contained in the SDP offer is to be conveyed via the terminating side eP-CSCF to the terminating side WIC. Once received and accepted, the terminating side WIC creates an SDP answer and sends it to the terminating side eP-CSCF. The information contained in the SDP answer in turn is to be conveyed via the originating side eP-CSCF to the originating side WIC.

If an originating side eP-CSCF (through which the WIC originating the call accesses the IMS) forwards an SDP offer from the originating side WIC towards the terminating side eP-CSCF and supports media plane optimization, and does not need to perform legal interception, then the eP-CSCF encapsulates the previously received SDP offer from the WIC.

The following steps are to be performed (originating side eP-CSCF):

1) eP-CSCF encapsulates each received session level SDP attribute into a "tra-att" attribute and adds this attribute as a session level attribute,
2) eP-CSCF encapsulates each received session-level bandwidth line into a "tra-bw" attribute and adds this attribute as a session level attribute,
3) if eP-CSCF decides to include a session level contact line in the SDP offer, eP-CSCF includes the address information as received from an enhanced IMS access gateway (eIMS-AGW) in that contact line and also encapsulates the address information into a "tra-contact" attribute and adds this attribute as a session level attribute, and
4) for each media line in the SDP offer sent on the Mw interface
   a) if the eP-CSCF decides to include a media level contact line in the SDP offer, eP-CSCF includes the address information as received from the eIMS-AGW in that contact line and also encapsulates the address information into a "tra-contact" attribute and adds this attribute as a media level attribute for the media line,
   b) eP-CSCF encapsulates the transmission control protocol (TCP) or user datagram protocol (UDP) port as received from the eIMS-AGW to be used in the outgoing SDP offer for the media line into a "tra-port" attribute and adds this attribute as a media level attribute for the media line,
   c) eP-CSCF encapsulates the corresponding received media line into a "tra-m-line" attribute and adds this attribute as a media level attribute for the media line,
   d) eP-CSCF encapsulates each received media level attributes for the corresponding received media line into a "tra-att" attribute", and adds this attribute as a media level attribute for the media line, and
   e) eP-CSCF encapsulates each received bandwidth line for the corresponding received media line into a "tra-bw" attribute, and adds this as a media level attribute for the media line.

When interacting with the eIMS-AGW to reserve resources and to provide the information needed for media handling, the eP-CSCF (originating side eP-CSCF) asks for resources suitable for the media described in the SDP offer outside the "tra-m-line", "tra-att" and "tra-bw" SDP attributes.

If an originating side eP-CSCF receives an SDP answer over Mw interface (i.e., from the terminating side eP-CSCF) and the SDP answer includes "tra-m-line" media level SDP attributes, the following steps are to be performed (originating side eP-CSCF):

1) when invoking the IMS-ALG procedures, eP-CSCF uses the media information received in "tra-contact", "tra-m-line", "tra-port", "tra-att", and "tra-bw" SDP attributes,
2) eP-CSCF removes all received SDP attributes and bandwidth lines from the forwarded SDP answer (this also includes "tra-contact", "tra-m-line", "tra-port", "tra-att", and "tra-bw" SDP attributes),
3) eP-CSCF de-encapsulates any SDP attributes received within session level "tra-att" SDP attributes and provides them as session level attributes in the SDP answer towards the (originating side) WIC,
4) eP-CSCF de-encapsulates any bandwidth lines received within session level "tra-bw" SDP attributes and provides them as session level bandwidth lines in the SDP answer towards the (originating side) WIC,
5) for each media line in the SDP offer sent towards the (originating side) WIC
   a) eP-CSCF de-encapsulates the media line received within the "tra-m-line" SDP attribute and provides it as media line in the SDP answer towards the (originating side) WIC, replacing the port number with the port allocated by its eIMS-AGW,
   b) eP-CSCF de-encapsulates any media level SDP attributes received within "tra-att" SDP attributes for the corresponding media line and provides them as media level attributes for the media line in the SDP answer towards the (originating side) WIC, and
   c) eP-CSCF de-encapsulates any media level bandwidth lines received within "tra-bw" SDP attributes for the corresponding media line and provides them as media level bandwidth line for the media line in the SDP answer towards the (originating side) WIC, and 6) eP-CSCF uses the thus generated SDP answer to invoke IMS application level gateway (IMS-ALG) procedures.

When interacting with eIMS-AGW, the eP-CSCF deactivates media plane interworking in the eIMS-AGW.

If a terminating side eP-CSCF receives an SDP offer over the Mw interface (i.e., from the originating side eP-CSCF) and the terminating side eP-CSCF supports media plane optimization, then the terminating side eP-CSCF determines for each media line whether media plane optimization is to be applied. Media plane optimization is to be applied when all of the following conditions are met:

1) the eP-SCSCF forwards the SDP offer towards a WIC,
2) the eP-SCSF does not need to perform legal interception,
3) for each media line, a "tra-port", and a "tra-m-line" media level SDP attribute has been received,
4) if a session level contact line is included in the received SDP, a "tra-contact" session level SDP attribute is also included in the received SDP, and the "contact-line" is the same as encapsulated within the "tra-contact" attribute,
5) if a media level contact line is included in the received SDP for any media line, a "tra-contact" media level SDP attribute is also included in the received SDP for that media line, and the "contact-line" is the same as encapsulated within the "tra-contact" attribute, and
6) for each received media line, the port value in the m-line is the same as within the media level "tra-port" attribute for that media line.

If media plane optimization is to be applied, the following steps are to be performed (terminating side eP-CSCF):

1) when invoking the IMS-ALG procedures, eP-CSCF uses the media information received in "tra-contact", "tra-m-line", "tra-port", "tra-att", and "tra-bw" SDP attributes (when interacting with eIMS-AGW, the eP-CSCF will deactivate media plane interworking in the eIMS-AGW),
2) eP-CSCF removes all received SDP attributes and bandwidth lines from the forwarded SDP offer (this also includes the "tra-contact", "tra-m-line", "tra-port", "tra-att", and "tra-bw" SDP attributes),
3) eP-CSCF de-encapsulates any SDP attributes received within session level "tra-att" SDP attributes and provides them as session level attributes in the SDP offer towards the WIC,
4) eP-CSCF de-encapsulates any bandwidth lines received within session level "tra-bw" SDP attributes and provides them as session level bandwidth lines in the SDP offer towards the WIC,
5) for each media line in the SDP offer sent towards the WIC:
   a) eP-CSCF de-encapsulates the media line received within the "tra-m-line" SDP attribute and provides it as media line in the SDP offer towards the WIC, replacing the port number with the port allocated by its eIMS-AGW,
   b) eP-CSCF de-encapsulates any media level SDP attributes received within "tra-att" SDP attributes for the corresponding media line and provides them as media level attributes for the media line in the SDP offer towards the WIC, and
   c) eP-CSCF de-encapsulates any media level bandwidth lines received within "tra-bw" SDP attributes for the corresponding media line and provides them as media level bandwidth line for the media line in the SDP offer towards the WIC.

If an terminating side eP-CSCF receives an SDP answer from the (terminating side) WIC and the terminating side eP-CSCF decided to apply media plane optimization when processing the corresponding SDP offer, the following steps are to be performed (terminating side eP-CSCF):

1) eP-CSCF generates an SDP answer based on the related SDP offer and the SDP answer received from the WIC (the selected formats of the answer need to be compliant with offered formats, media lines are disabled via port 0 if the corresponding media lines are disabled in the answer from the WIC),
2) eP-CSCF encapsulates each received session level SDP attribute into a "tra-att" attribute and adds this attribute as a session level attribute,
3) eP-CSCF encapsulates each received session-level bandwidth line into a "tra-bw" attribute and adds this attribute as a session level attribute, and
4) for each media line in the SDP answer sent on the Mw interface:
   a) eP-CSCF encapsulates the corresponding received media line into a "tra-m-line" attribute and adds this attribute as a media level attribute for the media line,
   b) eP-CSCF encapsulates each received media level attributes for the corresponding received media line into a "tra-att" attribute and adds this attribute as a media level attribute for the media line, and
   c) eP-CSCF encapsulates each received bandwidth line for the corresponding received media line into a "tra-bw" attribute and adds this attribute as a media level attribute for the media line.

For the above outlined procedures it is assumed that the number of SDP media lines between the WIC and the eP-CSCF and between the originating and the terminating eP-CSCF remain the same.

However, it is ascertained that this assumption does not always apply.

Namely, for certain types of media, e.g. messaging using MSRP (IETF RFC 4975), floor control using BFCP (IETF RFC 4582) and text telephony using ITU-T recommendation T.140, so-called data channels are used as media transport between WIC and eP-CSCF.

Data channels are either described in SDP or are negotiated inband using the data channel establishment protocol (DCEP).

Multiple media streams can be transported within a single stream control transmission protocol (SCTP) association, and will then be described using a single SDP media line, as shown in the example below.

Example SDP offer:
m=application 10001 UDP/DTLS/SCTP webrtc-datachannel
c=IN IP4 10.10.10.1
a=max-message-size:100000
a=sctp-port:5000
a=setup:actpass
a=connection:new
a=fingerprint:SHA-1 \
 4A:AD:B9:B1:3F:82:18:3B:54:02:12:DF:3E:5D:49:
 6B:19:E5:7C:AB
a=dcmap:0 subprotocol="BFCP";label="BFCP"
a=dcmap:2 subprotocol="MSRP";label="MSRP"
a=dcsa:2 accept-types:message/cpim text/plain
a=dcsa:2     path:msrp://alice.example.com:10001/2s93i93idj;dc Example SDP answer:
m=application 10002 UDP/DTLS/SCTP webrtc-datachannel c=IN IP4 10.10.10.2
a=max-message-size:100000
a=sctp-port:5002
a=setup:passive
a=connection:new
a=fingerprint:SHA-1 \
    5B:AD:67:B1:3E:82:AC:3B:90:02:B1:DF:12:5D:CA:
    6B:3F:E5:54:FA
a=dcmap:2 subprotocol="MSRP";label="MSRP"
a=dcsa:2 accept-types:message/cpim text/plain
a=dcsa:2          path:msrp://bob.example.com:10002/
    si438dsaodes;dc The above example SDP offer contains data channels for BFCP and MSRP sub-protocols. The example SDP answer rejected BFCP and accepted MSRP. So, the offerer should close the data channel for BFCP and both offerer and answerer may start using the MSRP data channel (after SCTP/DTLS association is setup). The data channel with stream id 0 is free and can be used for future DCEP or SDP offer/answer negotiation.

However, unlike the media transport between WIC and eP-CSCF, for the transport in the IMS core (e.g. between originating side eP-CSCF and terminating side eP-CSCF), media streams such as MSRP, BFCP or T.140 media streams are transported as TCP or UDP flows and thus need to be described as separate media lines in SDP.

Hence, the problem arises that the above outlined procedure may potentially assume incorrect preconditions, such that the outlined procedure may lead to unexpected results.

Further, the above outlined WebRTC media optimization procedures are be applied for all media lines together rather than independently for each media line. Namely, session level SDP attributes and bandwidth lines are encapsulated in session level SDP attributes rather than in media level SDP attributes for each media line.

However, an intermediate node could split an SDP offer into several offers for different media towards separate entities. An intermediate node could also disable certain media lines, for instance video media to convert a video call into a speech call.

Hence, the further problem arises that according to the above outlined procedure in case of a split of an SDP offer, session level encapsulated SDP information within "tra-att" and "tra-bw" SDP attributes would no longer be accurate.

Hence, there is a need to provide for enhanced media plane optimization in web real time communication scenarios.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving a first session description message comprising at least one media line indicative of multiple media streams transportable in a same stream control association, and generating, based on said first session description message, a second session description message indicative of a possibility for a separate transport of said multiple media streams and of a possibility for a joint transport of at least some media streams of said multiple media streams in the same stream control association.

According to a further exemplary aspect of the present invention, there is provided a method comprising receiving a first session description message comprising one media line per each media stream and an indication of a possibility for a joint transport of at least some media streams of multiple media streams in a same stream control association, and generating, based on said first session description message, a second session description message comprising at least one media line indicative of the said joint transport of the said at least some media streams in said same stream control association.

According to a further exemplary aspect of the present invention, there is provided a method comprising receiving a first session description message indicative of at least one media stream to be transported with a first transport and encoding, generating, based on said first session description message, a second session description message comprising for each of said at least one media streams at least one media line indicative that media stream to be transported with a second transport and encoding, and at least one encapsulating attribute which is indicative of the alternative possibility of said first transport and encoding, and adding, to said second session description message, media line number information indicative of a total number of said at least one media line in said second session description message.

According to a further exemplary aspect of the present invention, there is provided a method comprising receiving a session description message comprising at least one media line indicative of at least one media stream to be transported with a second transport and encoding, at least one encapsulating attribute which is indicative of the alternative possibility of a first transport and encoding, and media line number information indicative of a total number of said at least one media line in said session description message as originally generated, and deciding, based on said media line number information, whether to utilize said first transport and encoding for transportation of each of said at least one media stream corresponding to each of said at least one media line.

According to a further exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform: receiving a first session description message comprising at least one media line indicative of multiple media streams transportable in a same stream control association, and generating, based on said first session description message, a second session description message indicative of a possibility for a separate transport of said multiple media streams and of a possibility for a joint transport of at least some media streams of said multiple media streams in the same stream control association.

According to a further exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform: receiving a first session description message comprising one media line per each media stream and an indication of a possibility for a joint transport of at least some media streams of multiple media streams in a same stream control association, and generating, based on said first session description message, a second session description message comprising at least one media line indicative of the said joint transport of the said at least some media streams in said same stream control association.

According to a further exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform: receiving a first session description message indicative of at least one media stream to be transported with a first transport and encoding, generating, based on said first session description message, a second session description message comprising for each of said at least one media streams at least one media line indicative that media stream to be transported with a second transport and encoding, and at least one encapsulating attribute which is indicative of the alternative possibility of said first transport and encoding, and adding, to said second session description message, media line number information indicative of a total number of said at least one media line in said second session description message.

According to a further exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform: receiving a session description message comprising at least one media line indicative of at least one media stream to be transported with a second transport and encoding, at least one encapsulating attribute which is indicative of the alternative possibility of a first transport and encoding, and media line number information indicative of a total number of said at least one media line in said session description message as originally generated, and deciding, based on said media line number information, whether to utilize said first transport and encoding for transportation of each of said at least one media stream corresponding to each of said at least one media line.

According to a further exemplary aspect of the present invention, there is provided an apparatus, comprising receiving means configured to receive a first session description message comprising at least one media line indicative of multiple media streams transportable in a same stream control association, and generating means configured to generate, based on said first session description message, a second session description message indicative of a possibility for a separate transport of said multiple media streams and of a possibility for a joint transport of at least some media streams of said multiple media streams in the same stream control association.

According to a further exemplary aspect of the present invention, there is provided an apparatus, comprising receiving means configured to receive a first session description message comprising one media line per each media stream and an indication of a possibility for a joint transport of at least some media streams of multiple media streams in a same stream control association, and generating means configured to generate, based on said first session description message, a second session description message comprising at least one media line indicative of the said joint transport of the said at least some media streams in said same stream control association.

According to a further exemplary aspect of the present invention, there is provided an apparatus, comprising receiving means configured to receive a first session description message indicative of at least one media stream to be transported with a first transport and encoding, generating means configured to generate, based on said first session description message, a second session description message comprising for each of said at least one media streams at least one media line indicative that media stream to be transported with a second transport and encoding, and at least one encapsulating attribute which is indicative of the alternative possibility of said first transport and encoding, and adding means configured to add, to said second session description message, media line number information indicative of a total number of said at least one media line in said second session description message.

According to a further exemplary aspect of the present invention, there is provided an apparatus, comprising receiving means configured to receive a session description message comprising at least one media line indicative of at least one media stream to be transported with a second transport and encoding, at least one encapsulating attribute which is indicative of the alternative possibility of a first transport and encoding, and media line number information indicative of a total number of said at least one media line in said session description message as originally generated, and deciding means configured to decide, based on said media line number information, whether to utilize said first transport and encoding for transportation of each of said at least one media stream corresponding to each of said at least one media line.

According to a further exemplary aspect of the present invention, there is provided an apparatus, comprising receiving circuitry configured to receive a first session description message comprising at least one media line indicative of multiple media streams transportable in a same stream control association, and generating circuitry configured to generate, based on said first session description message, a second session description message indicative of a possibility for a separate transport of said multiple media streams and of a possibility for a joint transport of at least some media streams of said multiple media streams in the same stream control association.

According to a further exemplary aspect of the present invention, there is provided an apparatus, comprising receiving circuitry configured to receive a first session description message comprising one media line per each media stream and an indication of a possibility for a joint transport of at least some media streams of multiple media streams in a same stream control association, and generating circuitry configured to generate, based on said first session description message, a second session description message comprising at least one media line indicative of the said joint transport of the said at least some media streams in said same stream control association.

According to a further exemplary aspect of the present invention, there is provided an apparatus, comprising receiving circuitry configured to receive a first session description message indicative of at least one media stream to be transported with a first transport and encoding, generating circuitry configured to generate, based on said first session description message, a second session description message comprising for each of said at least one media streams at least one media line indicative that media stream to be transported with a second transport and encoding, and at least one encapsulating attribute which is indicative of the alternative possibility of said first transport and encoding, and adding circuitry configured to add, to said second session description message, media line number information indicative of a total number of said at least one media line in said second session description message.

According to a further exemplary aspect of the present invention, there is provided an apparatus, comprising receiving circuitry configured to receive a session description message comprising at least one media line indicative of at least one media stream to be transported with a second transport and encoding, at least one encapsulating attribute which is indicative of the alternative possibility of a first transport and encoding, and media line number information indicative of a total number of said at least one media line in said session description message as originally generated, and deciding circuitry configured to decide, based on said media line number information, whether to utilize said first transport and encoding for transportation of each of said at least one media stream corresponding to each of said at least one media line.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient handling of specific situations in the above illustrated scenarios to thereby solve at least part of the problems and drawbacks identified in relation to the prior art.

By way of exemplary embodiments of the present invention, there is provided enhanced media plane optimization in web real time communication scenarios. More specifically, by way of exemplary embodiments of the present invention, there are provided measures and mechanisms for realizing enhanced media plane optimization in web real time communication scenarios.

Thus, improvement is achieved by methods, apparatuses and computer program products enabling/realizing enhanced media plane optimization in web real time communication scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, WebRTC is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) enhanced media plane optimization in web real time communication scenarios.

Figure 1:
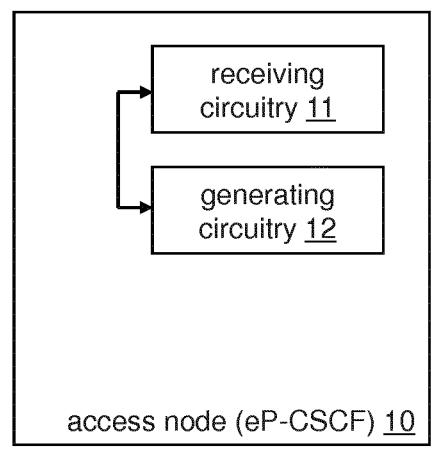
FIG. 1 is a block diagram illustrating an apparatus according to exemplary embodiments of the present invention.
Figure 5:
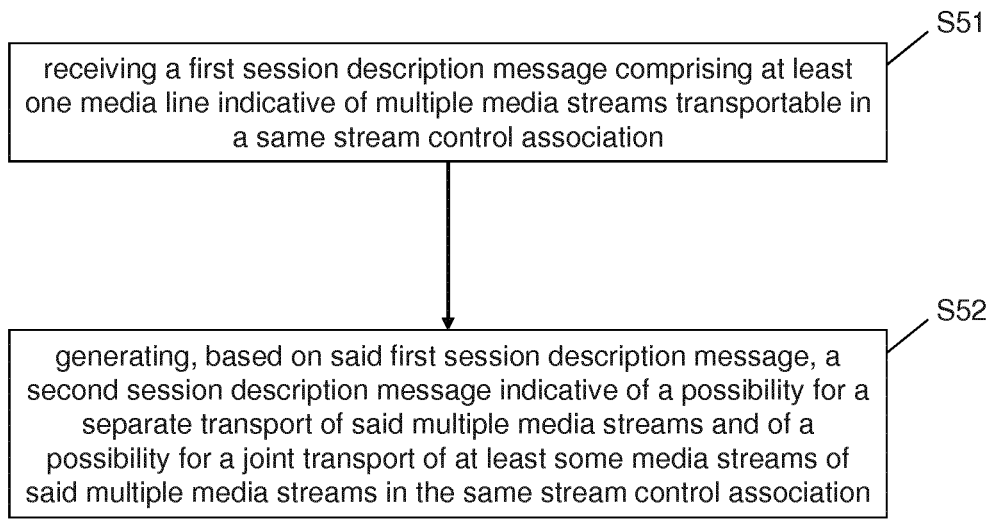
FIG. 5 is a schematic diagram of a procedure according to exemplary embodiments of the present invention.

FIG. 1 is a block diagram illustrating an apparatus according to exemplary embodiments of the present invention. The apparatus may be an access node 10 such as an eP-CSCF comprising a receiving circuitry 11 and a generating circuitry 12. The receiving circuitry 11 receives a first session description message comprising at least one media line indicative of multiple media streams transportable in a same stream control association. The first session control message may contain the description of only a single or several of the multiple media streams. Additional of the multiple media streams may be added by separate session control messages at a later point in time. The generating circuitry 12 generates, based on said first session description message, a second session description message indicative of a possibility for a separate transport of said multiple media streams and of a possibility for a joint transport of at least some media streams of said multiple media streams in the same stream control association. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51) a first session description message comprising at least one media line indicative of multiple media streams transportable in a same stream control association, and an operation of generating (S52), based on said first session description message, a second session description message indicative of a possibility for a separate transport of said multiple media streams and of a possibility for a joint transport of at least some media streams of said multiple media streams in the same stream control association.

In other words, when receiving an SDP offer for multiple media streams within data channels within a single SCTP association from the originating side WIC, the originating side eP-CSCF offers a transparent transport of the data channels as an alternative to a separate transport of multiple media streams outside the data channels in SDP by providing indications within SDP for at least some of the media lines offering the separate transport of media that are to be transported in the same SCTP association between WIC and eP-CSCF, that those media lines relate to media that are to be transported in the same SCTP association when transparent transport is selected.

Figure 2:
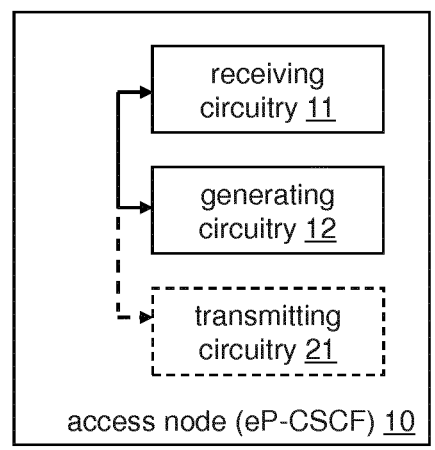
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a transmitting circuitry 21.

In an embodiment at least some of the functionalities of the apparatus shown in FIG. 1 or 2 may be shared between two (or more) physically separate devices forming one operational entity. Therefore, the apparatus may be seen to depict the operational entity comprising one or more physically separate devices for executing at least some of the described processes.

According to variations of the procedure shown in FIG. 5, below, exemplary details of mentioned operations and/or exemplary additional operations are given, which are inherently independent from each other as such.

According to further exemplary embodiments of the present invention, said second session description message comprises one media line per each media stream of said multiple media streams, and information on said at least some media streams indicative of that said at least some media streams belong to the same stream control association.

According to further exemplary embodiments of the present invention, said information comprises ordinal numbers of said media lines corresponding to said at least some media streams, wherein said ordinal numbers correspond to an order of said media lines in said second session description message.

In other words, according to such further exemplary embodiments, the indication within SDP that media lines relate to media that are to be transported in the same SCTP association when transparent transport is selected is provided by a (new) SDP session level attribute giving the ordinal numbers of all media lines that describe media that are to be transported within the same data channel.

Such (new) SDP attribute may read, for instance, tra-same-SCTP-association="tra-same-SCTP-association" ":" m-line-number *["," m-line-number]
where m-line-number is the ordinal number of an SDP media line to be transported within the SCTP association if transparent transport is selected.

A complete SDP offer according to the above session level encoding could look like:
C=IN IP4 10.10.10.1
a=tra-same-SCTP-association:1,2
m=application 50000 TCP/BFCP *
a=setup:actpass
a=connection:new
a=tra-m-line:application 10001 UDP/DTLS/SCTP webrtc-datachannel
a=tra-port:50000
a=tra-contact:IN IP4 10.10.10.1
a=tra-att:max-message-size:100000
a=tra-attsctp-port:5000
a=tra-att:setup:actpass
a=tra-att:connection:new
a=tra-att:fingerprint:SHA-1 \
    4A:AD:B9:B1:3F:82:18:3B:54:02:12:DF:3E:5D:49:
    6B:19:E5:7C:AB
a=tra-att:dcmap:0 subprotocol="BFCP";label="BFCP"
m=application 50001 TCP/MSRP *
a=tra-port:50001
a=accept-types:message/cpim text/plain
a=path:msrp://alice.example.com:10001/2s93i93idj;dc
a=tra-att:dcmap:2 subprotocol="MSRP";label="MSRP"
a=tra-att:dcsa:2 accept-types:message/cpim text/plain
a=tra-att:dcsa:2 path:msrp://alice.example.com:10001/ 2s93i93idj;dc In this example, the session level SDP attribute "tra-same-SCTP-association:1,2" denotes that the first and the second media line relate to the same SCTP association, According to further exemplary embodiments of the present invention, said information comprises information elements respectively belonging to said media lines corresponding to said at least some media streams, wherein each information element of said information elements comprises ordinal numbers of said media lines corresponding to said at least some media streams other than the media line said information element belongs to, wherein said ordinal numbers correspond to an order of said media lines in said second session description message.

In other words, according to such further exemplary embodiments, the indication within SDP that media lines relate to media that are to be transported in the same SCTP association when transparent transport is selected is provided by a (new) media level SDP attribute giving the ordinal numbers of all other media lines that describe media that are to be transported within the same SCTP association.

Such (new) SDP attribute may read, for instance,
tra-same-SCTP-association="tra-same-SCTP-association"
":" m-line-number *[","  m-line-number]
where m-line-number is the ordinal number of an SDP media line to be transported within the SCTP association if transparent transport is selected.

The (new) SDP attribute is used as media level attribute of related media lines (which are to be transported within the same SCTP association).

A complete SDP offer according to the above media level encoding could look like:
C=IN IP4 10.10.10.1
m=application 50000 TCP/BFCP *
a=tra-same-SCTP-association:2
a=setup:actpass
a=connection:new
a=tra-m-line:application 10001 UDP/DTLS/SCTP webrtc-datachannel
a=tra-port:50000
a=tra-contact:IN IP4 10.10.10.1
a=tra-att:max-message-size:100000
a=tra-att:sctp-port:5000
a=tra-att:setup:actpass
a=tra-att:connection:new
a=tra-att:fingerprint:SHA-1 \
   4A:AD:B9:B1:3F:82:18:3B:54:02:12:DF:3E:5D:49:
   6B:19:E5:7C:AB
a=tra-att:dcmap:0 subprotocol="BFCP";label="BFCP"
m=application 50001 TCP/MSRP *
a=tra-same-SCTP-association:1
a=tra-port:50001
a=accept-types:message/cpim text/plain
a=path:msrp://alice.example.com:10001/2s93i93idj;dc
a=tra-att:dcmap:2 subprotocol="MSRP";label="MSRP"
a=tra-att:dcsa:2 accept-types:message/cpim text/plain
a=tra-att:dcsa:2 path:msrp://alice.example.com:10001/2s93i93idj;dc In this example, the media level SDP attribute "tra-same-SCTP-association:2" of the first media line denotes that the second media line relates to the same SCTP association as the first media line. In a similar manner, the media level SDP attribute "tra-same-SCTP-association:1" of the second media line denotes that the first media line relates to the same SCTP association as the first media line According to further exemplary embodiments of the present invention, said stream control association is assigned an association number, and said information comprises information elements respectively belonging to said media lines corresponding to said at least some media streams, wherein each information element of said information elements comprises said association number assigned to the same stream control association.

In other words, according to such further exemplary embodiments, the indication within SDP that media lines relate to media that are to be transported in the same SCTP association when transparent transport is selected is provided by a (new) media level SDP attribute giving a number assigned to the SCTP association via this attribute.

Such (new) SDP attribute may read, for instance,
tra-SCTP-association="tra-SCTP-association" ":" SCTP-association-number
where SCTP-association-number is an number assigned to the SCTP association. All media lines to be transported within the same SCTP association are marked with the same SCTP association number.

A complete SDP offer according to the above media level encoding could look like:
C=IN IP4 10.10.10.1
m=application 50000 TCP/BFCP *
a=tra-SCTP-association:1
a=setup:actpass
a=connection:new
a=tra-m-line:application 10001 UDP/DTLS/SCTP webrtc-datachannel
a=tra-port:50000
a=tra-contact:IN IP4 10.10.10.1
a=tra-att:max-message-size:100000
a=tra-att:sctp-port:5000
a=tra-att:setup:actpass
a=tra-att:connection:new
a=tra-att:fingerprint:SHA-1 \
   4A:AD:B9:B1:3F:82:18:3B:54:02:12:DF:3E:5D:49:
   6B:19:E5:7C:AB
a=tra-att:dcmap:0 subprotocol="BFCP";label="BFCP"
m=application 50001 TCP/MSRP *
a=tra-SCTP-association:1
a=tra-port:50001
a=accept-types:message/cpim text/plain
a=path:msrp://alice.example.com:10001/2s93i93idj;dc
a=tra-att:dcmap:2 subprotocol="MSRP";label="MSRP"
a=tra-att:dcsa:2 accept-types:message/cpim text/plain
a=tra-att:dcsa:2 path:msrp://alice.example.com:10001/2s93i93idj;dc In this example, the media level SDP attributes "tra-SCTP-association:1" of the first and of the second media line denote that the first and the second media lines relate to the SCTP association 1.

According to further exemplary embodiments of the present invention, each media line of said second session description message is assigned a unique number, and said information comprises the unique numbers assigned to said media lines corresponding to said at least some media streams.

In other words, according to such further exemplary embodiments, the indication within SDP that media lines relate to media that are to be transported in the same SCTP association when transparent transport is selected is provided by a (new) semantics within the SDP grouping framework.

A complete SDP offer according to the above encoding could look like:
C=IN IP4 10.10.10.1
a=group:TRSA 1 2
m=application 50000 TCP/BFCP *
a=mid:1
a=setup:actpass
a=connection:new
a=tra-m-line:application 10001 UDP/DTLS/SCTP webrtc-datachannel
a=tra-port:50000
a=tra-contact:IN IP4 10.10.10.1
a=tra-att:max-message-size:100000
a=tra-attsctp-port:5000
a=tra-att:setup:actpass
a=tra-att:connection:new
a=tra-att:fingerprint:SHA-1 \
   4A:AD:B9:B1:3F:82:18:3B:54:02:12:DF:3E:5D:49:
   6B:19:E5:7C:AB
a=tra-att:dcmap:0 subprotocol="BFCP";label="BFCP"
m=application 50001 TCP/MSRP *
a=mid:2
a=tra-port:50001 a=accept-types:message/cpim text/plain
a=path:msrp://alice.example.com:10001/2s93i93idj;dc
a=tra-att:dcmap:2 subprotocol="MSRP";label="MSRP"
a=tra-att:dcsa:2 accept-types:message/cpim text/plain
a=tra-att:dcsa:2 path:msrp://alice.example.com:10001/2s93i93idj;dc In this example, the media level SDP attribute "mid:1" of the first media line and "mid:2" of the second media line denote assign the markers "1" and "2" to those media lines, respectively. The session level attribute "group:TRSA 1 2" denotes that the media lines with the markers "1" and "2" are grouped together with the semantics "TRSA". The (new) semantics "TRSA" denotes that the grouped media lines relate to the same SCTP association.

According to further exemplary embodiments of the present invention, predetermined attributes related to said joint transport of said at least some media streams in said same stream control association are added to one media line of said media lines corresponding to said at least some media streams.

Namely, in other words, according to such further exemplary embodiments of the present invention, the "tra-contact", "tra-m-line" and/or "tra-att" SDP attributes describing the SCTP association are only provided for one of the media lines relating to the media transported within the (same) SCTP association to avoid duplicated information. However, to assist the mapping of data channels to media lines, it is preferable that "dcmap" and "dcsa" attributes for a media stream are encapsulated in "tra-att" attributes for the corresponding media line (as shown in the examples of SDP offers above).

According to a variation of the procedure shown in FIG. 5, an exemplary method according to exemplary embodiments of the present invention may additionally comprise an operation of transmitting said second session description message.

Figure 3:
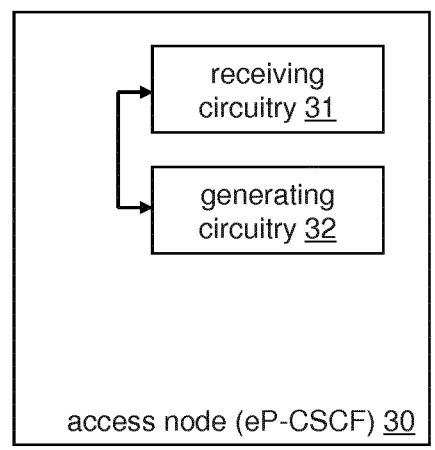
FIG. 3 is a block diagram illustrating an apparatus according to exemplary embodiments of the present invention.
Figure 6:
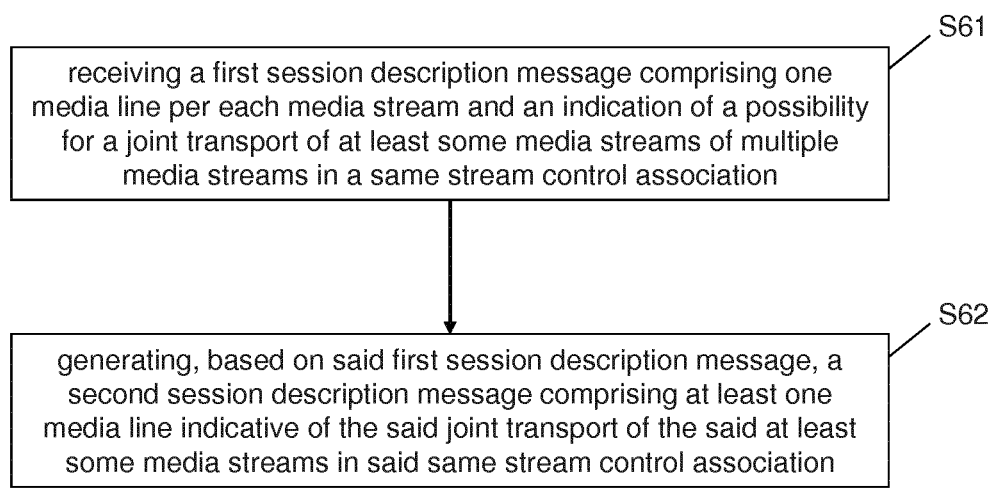
FIG. 6 is a schematic diagram of a procedure according to exemplary embodiments of the present invention.

FIG. 3 is a block diagram illustrating an apparatus according to exemplary embodiments of the present invention. The apparatus may be an access node 30 such as an eP-CSCF comprising a receiving circuitry 31 and a generating circuitry 32. The receiving circuitry 31 receives a first session description message comprising one media line per each media stream and an indication of a possibility for a joint transport of at least some media streams of multiple media streams in a same stream control association, and the generating circuitry 32 generates, based on said first session description message, a second session description message comprising at least one media line indicative of the said joint transport of the said at least some media streams in said same stream control association. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of receiving (S61) a first session description message comprising one media line per each media stream and an indication of a possibility for a joint transport of at least some media streams of multiple media streams in a same stream control association, and an operation of generating (S62), based on said first session description message, a second session description message comprising at least one media line indicative of the said joint transport of the said at least some media streams in said same stream control association.

In other words, when the terminating side eP-CSCF receives an SDP offer (from the originating side eP-CSCF) that describes media in separate media lines and also contains indication(s) that at least some of the media can also be transported transparently in a single SCTP association, and the terminating eP-CSCF decides to select the transparent transport, it generates an SDP offer (to the terminating side WIC) describing media streams to be transported in a single SCTP association within a single media line related to that SCTP association.

Figure 4:
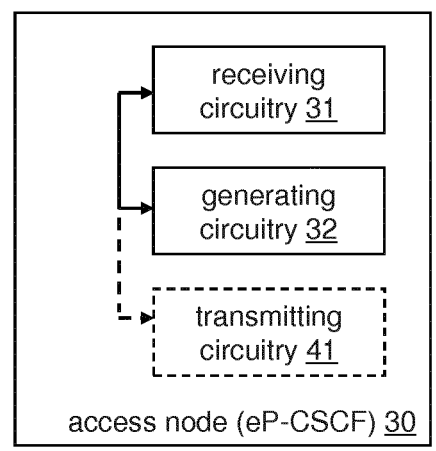
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a transmitting circuitry 41.

In an embodiment at least some of the functionalities of the apparatus shown in FIG. 3 or 4 may be shared between two (or more) physically separate devices forming one operational entity. Therefore, the apparatus may be seen to depict the operational entity comprising one or more physically separate devices for executing at least some of the described processes.

According to variations of the procedure shown in FIG. 6, below, exemplary details of mentioned operations and/or exemplary additional operations are given, which are inherently independent from each other as such.

According to further exemplary embodiments of the present invention, said first session description message comprises information on said at least some media streams indicative of that said at least some media streams belong to the same stream control association.

According to further exemplary embodiments of the present invention, said information comprises ordinal numbers of said media lines corresponding to said at least some media streams, wherein said ordinal numbers correspond to an order of said media lines in said first session description message.

In other words, as discussed above in relation to the method of FIG. 5, according to such further exemplary embodiments, the indication within SDP that media lines relate to media that are to be transported in the same SCTP association when transparent transport is selected is provided by a (new) SDP attribute giving the ordinal numbers of either all other or all media lines that describe media that are to be transported within the same data channel.

According to further exemplary embodiments of the present invention, said information comprises information elements respectively belonging to said media lines corresponding to said at least some media streams, wherein each information element of said information elements comprises ordinal numbers of said media lines corresponding to said at least some media streams other than the media line said information element belongs to, wherein said ordinal numbers correspond to an order of said media lines in said first session description message.

In other words, as discussed above in relation to the method of FIG. 5, according to such further exemplary embodiments, the indication within SDP that media lines relate to media that are to be transported in the same SCTP association when transparent transport is selected is provided by a (new) SDP attribute giving the ordinal numbers of all other media lines that describe media that are to be transported within the same data channel.

According to further exemplary embodiments of the present invention, said stream control association is assigned an association number, and said information comprises information elements respectively belonging to said media lines corresponding to said at least some media streams, wherein each information element of said information elements comprises said association number assigned to the same stream control association.

In other words, as discussed above in relation to the method of FIG. 5, according to such further exemplary embodiments, the indication within SDP that media lines relate to media that are to be transported in the same SCTP association when transparent transport is selected is provided by a (new) media level SDP attribute giving a number assigned to the SCTP association via this attribute.

According to further exemplary embodiments of the present invention, each media line of said second session description message is assigned a unique number, and said information comprises the unique numbers assigned to said media lines corresponding to said at least some media streams.

In other words, as discussed above in relation to the method of FIG. 5, according to such further exemplary embodiments, the indication within SDP that media lines relate to media that are to be transported in the same SCTP association when transparent transport is selected is provided by a (new) semantics within the SDP grouping framework.

According to further exemplary embodiments of the present invention, predetermined attributes related to said joint transport of said at least some media streams in said same stream control association are added to one media line of said media lines corresponding to said at least some media streams.

According to a variation of the procedure shown in FIG. 6, an exemplary method according to exemplary embodiments of the present invention may additionally comprise an operation of transmitting said second session description message.

The first session description message may be one of a session description protocol (SDP) offer or a session description protocol (SDP) answer.

Further, the second session description message may be one of a session description protocol (SDP) offer or a session description protocol (SDP) answer.

That is, in other words, while the methods according to FIGS. 5 and 6 are explained by means of SDP offers, according to preferable exemplary embodiments of the present invention, similar procedures are also applied for the SDP answers.

Namely, when receiving an SDP answer for multiple media streams within a SCTP association from the (terminating side) WIC and the terminating side WIC decided to use transparent media, the terminating side eP-CSCF describes the transparent transport of the SCTP association as an alternative to a separate transport of multiple media streams outside the SCTP association in SDP by providing indications within SDP for at least some of the media lines offering the separate transport of media that are to be transported in the same SCTP association between WIC and eP-CSCF, that those media lines relate to media that are to be transported in the same SCTP association for the selected transparent transport.

Further, when the originating side eP-CSCF receives an SDP answer that describes media in separate media lines and also contains indication(s) that at least some of the media can also be transported transparently in a single SCTP association, it generates an SDP answer (to originating side WIC) describing media streams to be transported in a single SCTP association within a single media line related to that SCTP association.

Furthermore, the stream control association may be a stream control transmission protocol (SCTP) association.

Both, the method according to FIG. 5 as well as the method according to FIG. 6 may be operable at or by an enhanced proxy call session control function node of a cellular system, and may be operable in at least one of a LTE and a LTE-A cellular system.

According to further exemplary embodiments of the present invention, the indication within an SDP offer or answer that media lines relate to media that are to be transported in the same SCTP association is used by the eP-CSCF to determine which media streams need to be multiplexed into the same SCTP association and to configure the attached eIMS-AGW accordingly.

Figure 7:
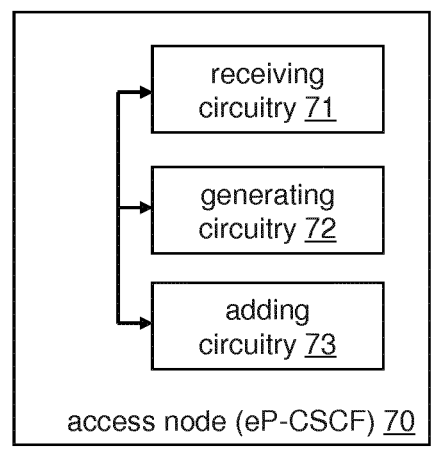
FIG. 7 is a block diagram illustrating an apparatus according to exemplary embodiments of the present invention.
Figure 11:
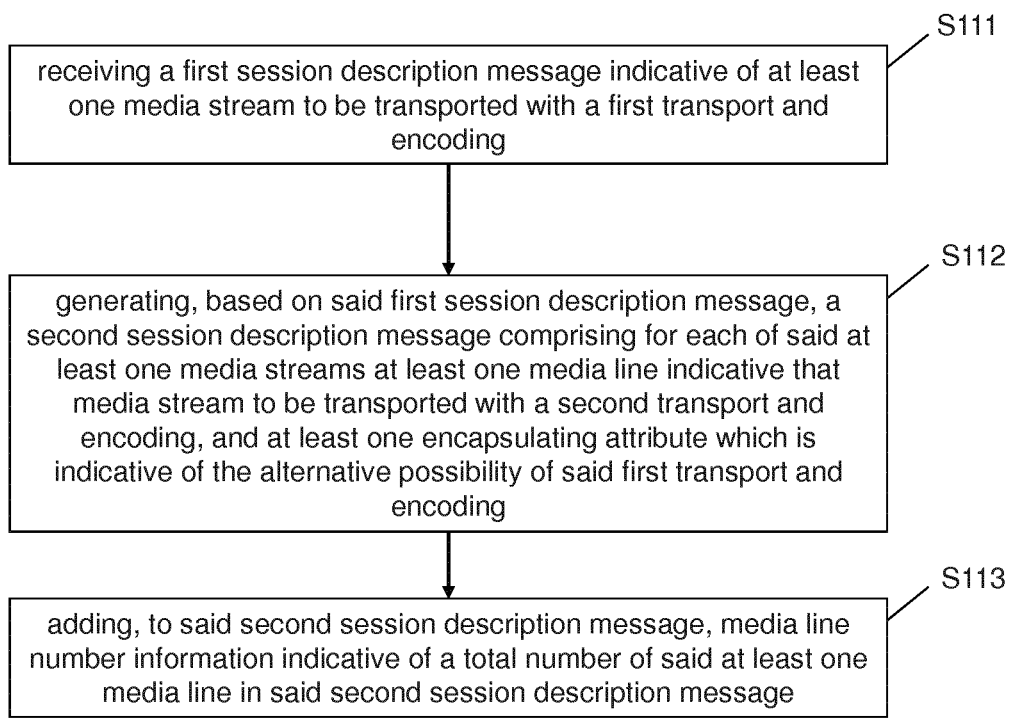
FIG. 11 is a schematic diagram of a procedure according to exemplary embodiments of the present invention.

FIG. 7 is a block diagram illustrating an apparatus according to exemplary embodiments of the present invention. The apparatus may be an access node 70 such as an eP-CSCF comprising a receiving circuitry 71, a generating circuitry 72, and an adding circuitry 73. The receiving circuitry 71 receives a first session description message indicative of at least one media stream to be transported with a first transport and encoding. The generating circuitry 72 generates, based on said first session description message, a second session description message comprising for each of said at least one media streams one media line indicative of that media stream to be transported with a second transport and encoding, and at least one encapsulating attribute which is indicative of the alternative possibility of said first transport and encoding. Further, the adding circuitry 73 adds, to said second session description message, media line number information indicative of a total number of said at least one media line in said second session description message. The first transport may be within a stream control association and the second transport may be outside a stream control association. FIG. 11 is a schematic diagram of a procedure according to exemplary embodiments of the present invention. The apparatus according to FIG. 7 may perform the method of FIG. 11 but is not limited to this method. The method of FIG. 11 may be performed by the apparatus of FIG. 7 but is not limited to being performed by this apparatus.

As shown in FIG. 11, a procedure according to exemplary embodiments of the present invention comprises an operation of receiving (S111) a first session description message indicative of at least one media stream to be transported with a first transport and encoding, an operation of generating (S112), based on said first session description message, a second session description message comprising for each of said at least one media streams one media line indicative of that media stream to be transported with a second transport and encoding or with said first transport and encoding, and at least one encapsulating attribute which is indicative of the alternative possibility of said first transport and encoding, and an operation of adding (S113), to said second session description message, media line number information indicative of a total number of said at least one media line in said second session description message.

In other words, according to exemplary embodiments of the present invention, when the originating side eP-CSCF offers the transparent transport of media as offered by the WIC as an alternative to media streams in some other format suitable for the IMS, it also provides an explicit indication of the total number of media lines in the SDP offer it sends.

Namely, in rare occasions, intermediate nodes may delete or disable (with port zero) single media lines in an SDP offer they forward (e.g. to change a video to a voice call), and/or split a single SDP offer in separate parts for different media to be forwarded in separate session initiation protocol (SIP) messages to different devices.

If single media lines are removed, session level information such as total bandwidth information within an "a=tra-bw" encapsulating SDP attribute becomes inaccurate. Further, the alternative transport within a single SCTP association is not feasible if some media streams are to be terminated or media streams need to be sent to different destinations According to exemplary embodiments of the present invention, the terminating side eP-CSCF shall decide not to use optimized media in the rare occasions where media lines were removed. However, the terminating side eP-CSCF lacks means to detect when an intermediate entity has split an SDP offer into several parts towards different entities. To enable the terminating side eP-CSCF to detect such modifications, according to exemplary embodiments of the present invention the original number of media lines within the SDP is encapsulated as, e.g., "tra-media-line-number".

An intermediate will either pass unknown SDP attributes such as the "tra-media-line-number" or will remove such attributes.

In more concrete terms, the explicit indication of the total number of media lines may be encoded in a session-level SDP attribute.

Such (new) SDP attribute may read, for instance,
tra-media-line-number="tra-media-line-number" ":" m-line-number
where m-line-number is the total number of media lines in the SDP offer sent by the originating side eP-SCSF.

A SDP offer according to the above session level encoding could look like:
C=IN IP4 10.10.10.1
a=tra-contact:IN IP4 10.10.10.1
a=tra-media-line-number2
a=tra-bw:AS:1000
m=audio 50000 RTP/AVP 1
a=tra-m-line:audio 10001 RTP/SAVP 101
a=tra-port:50000
a=tra-att: rtpmap:101 opus/48000/2
m=video 50001 RTP/AVPF 99
a=tra-att: rtpmap:99 yyy
a=tra-port:50001
a=tra-m-line:video 10001 RTP/SAVP 102
a=tra-port:50000
a=tra-contact:IN IP4 10.10.10.1
a=tra-att: rtpmap:102 xxx In this example, tra-media-line-number:2 indicates that the session description protocol as originally generated contained two media lines.

Figure 8:
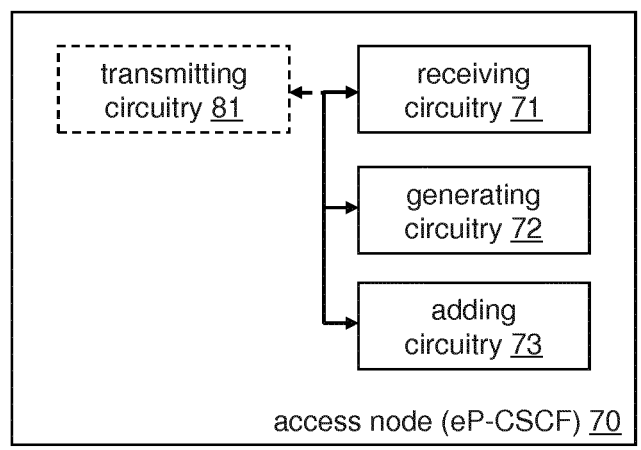
FIG. 8 is a block diagram illustrating an apparatus according to exemplary embodiments of the present invention.

FIG. 8 is a block diagram illustrating an apparatus according to exemplary embodiments of the present invention. In particular, FIG. 8 illustrates a variation of the apparatus shown in FIG. 7. The apparatus according to FIG. 8 may thus further comprise a transmitting circuitry 81.

In an embodiment at least some of the functionalities of the apparatus shown in FIG. 7 or 8 may be shared between two (or more) physically separate devices forming one operational entity. Therefore, the apparatus may be seen to depict the operational entity comprising one or more physically separate devices for executing at least some of the described processes.

According to variations of the procedure shown in FIG. 11, below, exemplary details of mentioned operations and/or exemplary additional operations are given, which are inherently independent from each other as such.

According to a variation of the procedure shown in FIG. 11, an exemplary method according to exemplary embodiments of the present invention may additionally comprise an operation of transmitting said second session description message.

Figure 9:
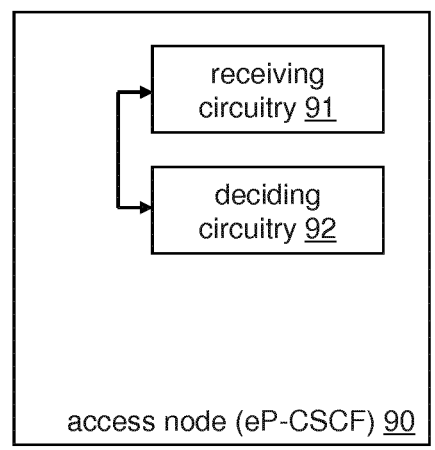
FIG. 9 is a block diagram illustrating an apparatus according to exemplary embodiments of the present invention.
Figure 12:
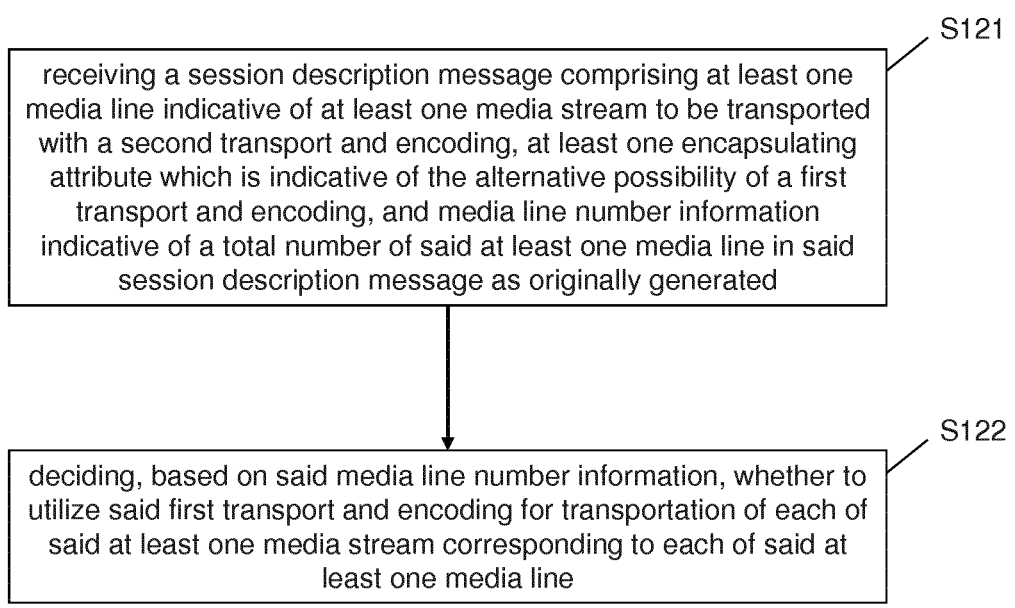
FIG. 12 is a schematic diagram of a procedure according to exemplary embodiments of the present invention.

FIG. 9 is a block diagram illustrating an apparatus according to exemplary embodiments of the present invention. The apparatus may be an access node 90 such as an eP-CSCF comprising a receiving circuitry 91 and a deciding circuitry 92. The receiving circuitry 91 receives a session description message comprising at least one media line indicative of at least one media stream to be transported with a second transport and encoding, at least one encapsulating attribute which is indicative of the alternative possibility of a first transport and encoding, and media line number information indicative of a total number of said at least one media line in said session description message as originally generated. The deciding circuitry 92 decides, based on said media line number information, whether to utilize said first transport and encoding for transportation of each of said at least one media stream corresponding to each of said at least one media line. FIG. 12 is a schematic diagram of a procedure according to exemplary embodiments of the present invention. The apparatus according to FIG. 9 may perform the method of FIG. 12 but is not limited to this method. The method of FIG. 12 may be performed by the apparatus of FIG. 9 but is not limited to being performed by this apparatus.

As shown in FIG. 12, a procedure according to exemplary embodiments of the present invention comprises an operation of receiving (S121) a session description message comprising at least one media line indicative of at least one media stream to be transported, at least one encapsulating attribute which is indicative of the alternative possibility of a first transport and encoding, and media line number information indicative of a total number of said at least one media line in said session description message as originally generated, and an operation of deciding (S122), based on said media line number information, whether to utilize said first transport and encoding for transportation of each of said at least one media stream corresponding to each of said at least one media line.

Figure 10:
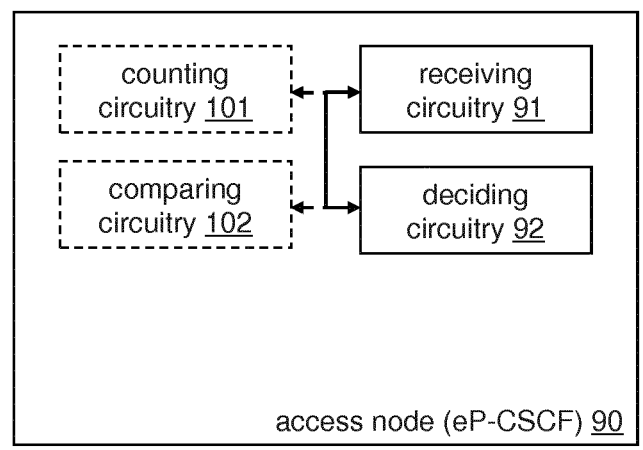
FIG. 10 is a block diagram illustrating an apparatus according to exemplary embodiments of the present invention.

FIG. 10 is a block diagram illustrating an apparatus according to exemplary embodiments of the present invention. In particular, FIG. 10 illustrates a variation of the apparatus shown in FIG. 9. The apparatus according to FIG. 9 may thus further comprise a counting circuitry 101 and/or a comparing circuitry 102.

In an embodiment at least some of the functionalities of the apparatus shown in FIG. 9 or 10 may be shared between two (or more) physically separate devices forming one operational entity. Therefore, the apparatus may be seen to depict the operational entity comprising one or more physically separate devices for executing at least some of the described processes.

According to variations of the procedure shown in FIG. 12, below, exemplary details of mentioned operations and/or exemplary additional operations are given, which are inherently independent from each other as such.

According to a variation of the procedure shown in FIG. 12, an exemplary method according to exemplary embodiments of the present invention may additionally comprise an operation of counting each media line in said received session description message, and an operation of comparing a result of said counting and said total number of said at least one media line in said session description message as originally derived from said media line number information. If said result of said counting and said total number of said at least one media line in said session description message as originally generated derived from said media line number information do not match, it is decided (deciding step S122) not to utilize said first transport and encoding for transportation of each of said at least one media stream corresponding to each of said at least one media line.

According to a further variation of the procedure shown in FIG. 12, if said media line number information is absent from said received session description message, it is also decided (deciding step S122) not to utilize said first transport and encoding for transportation of each of said at least one media stream corresponding to each of said at least one media line.

In other words, when the terminating side eP-CSCF receives an SDP offer that contains an offer for the transparent transport of media as an alternative to media streams in some other format and also contains an indication of the total number of media lines in the SDP offer, the terminating side eP-CSCF compares the total number of media lines in the explicit indication with the total number of media lines in the received SDP offer. If those numbers do not match, or if the indication with the total number of media lines is missing in the received SDP offer, the terminating side eP-CSCF decides not to use the alternative transparent transport of media, and indicates this decision towards the originating side eP-CSCF in the related SDP answer.

Namely, as mentioned above in relation to the method of FIG. 11, according to exemplary embodiments of the present invention, the terminating side eP-CSCF shall decide not to use optimized media in the rare occasions where media lines were removed. In order to enable the terminating side eP-CSCF to do so, according to exemplary embodiments of the present invention the originating side eP-CSCF provides an explicit indication of the total number of media lines in the SDP offer it sends.

A resulting SDP offer according to the above session level encoding could look like:
C=IN IP4 10.10.10.1
a=tra-contact:IN IP4 10.10.10.1
a=tra-media-line-number2
a=tra-bw:AS:1000
m=audio 50000 RTP/AVP 1
a=tra-m-line:audio 10001 RTP/SAVP 101
a=tra-port:50000
a=tra-att: rtpmap:101 opus/48000/2
m=video 50001 RTP/AVPF 99
a=tra-att: rtpmap:99 yyy
a=tra-port:50001
a=tra-m-line:video 10001 RTP/SAVP 102
a=tra-port:50000
a=tra-contact:IN IP4 10.10.10.1
a=tra-att: rtpmap:102 xxx In this example, tra-media-line-number:2 indicates that the session description protocol as originally generated contained two media lines.

If, for example, an intermediate node decides to convert the offered video call into an audio-only call by removing the second m-line and all related SDP attributes from the SDP offer, the SDP offer might look like:
C=IN IP4 10.10.10.1
a=tra-contact:IN IP4 10.10.10.1
a=tra-media-line-number2
a=tra-bw:AS:1000
m=audio 50000 RTP/AVP 1
a=tra-m-line:audio 10001 RTP/SAVP 101
a=tra-port:50000
a=tra-att: rtpmap:101 opus/48000/2

In such example case, the encapsulated total bandwidth information in the "a=tra-bw:AS:1000" SDP attribute is no longer appropriate for the audio call. Further, the number of media lines indicated in the "a=tra-media-line-number" SDP attribute (i.e. 2) does no longer match the real number of media lines in the SDP answer (i.e. 1).

Hence, according to exemplary embodiments of the present invention, the terminating side eP-CSCF compares the number of media lines indicated in the "a=tra-media-line-number" SDP attribute (i.e. 2) with the real number of media lines in the SDP answer (i.e. 1). As those numbers do not match, the terminating side eP-CSCF, according to exemplary embodiments of the present invention, decides to discard all information in the received "a=tra-m-line", "a=tra-bw", and "a=tra-att" SDP attributes, constructs an SDP offer towards the served WIC based on the offered media in the normal SDP m-line, and does not include "a=tra-m-line", "a=tra-bw", and "a=tra-att" SDP attributes in the SDP answer it sends towards the originating eP-CSCF, which could then look like:
C=IN IP4 10.10.10.2
m=audio 50000 RTP/AVP 1

Both, the method according to FIG. 11 as well as the method according to FIG. 12 may be operable at or by an enhanced proxy call session control function node of a cellular system, and may be operable in at least one of a LTE and a LTE-A cellular system.

The first session description message, the second session description message, and/or the session description message may be one of a session description protocol offer or a session description protocol answer. The transportation may be a transparent transport of media streams.

Figure 13:
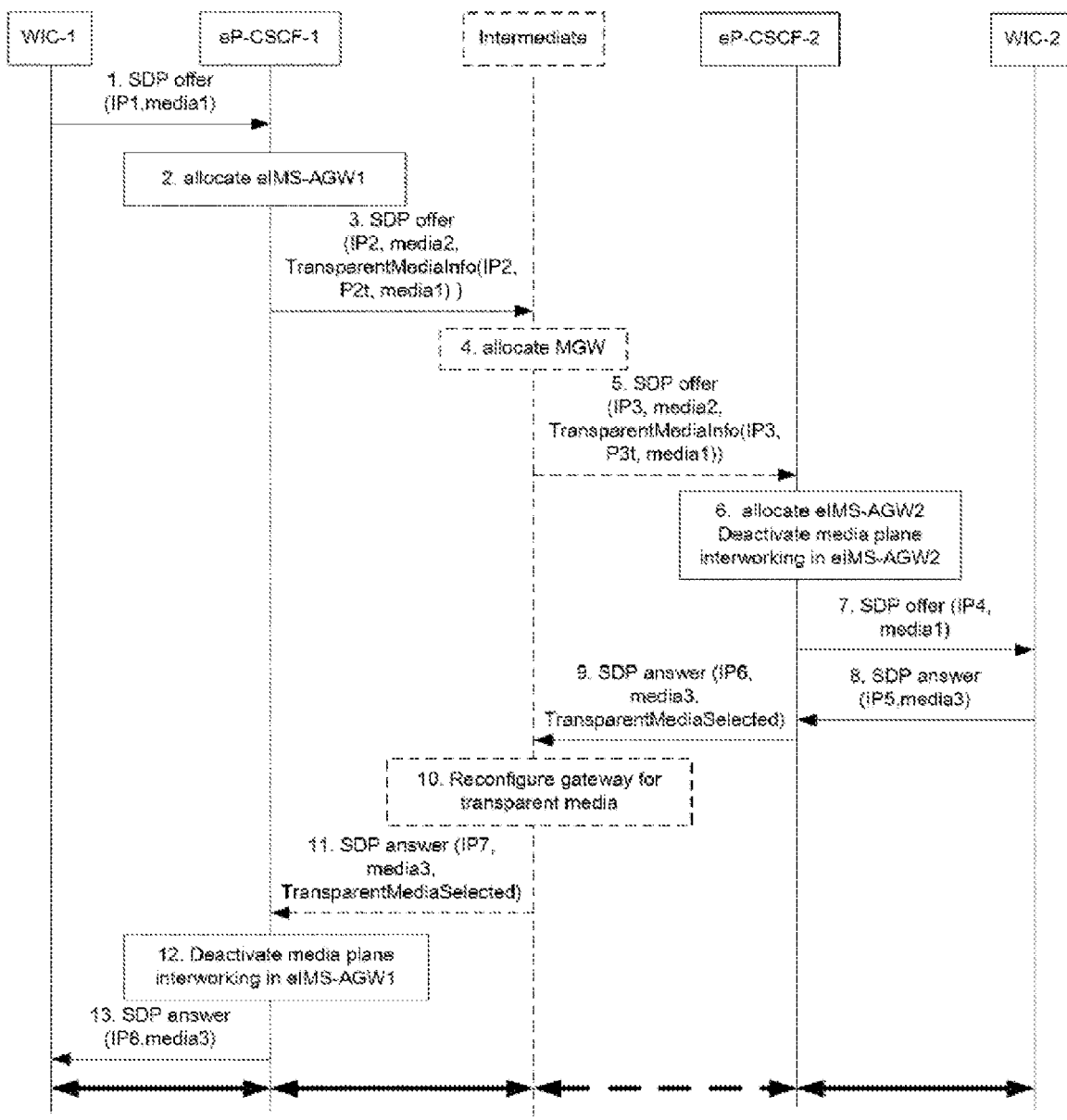
FIG. 13 shows a schematic diagram of an example system environment with signaling sequences according to exemplary embodiments of the present invention.

FIG. 13 shows a schematic diagram of an example system environment with signaling sequences according to exemplary embodiments of the present invention.

In particular, FIG. 13 illustrates an WIC-1 as an originating side WIC accessing the IMS via an eP-CSCF-1 as an originating side eP-CSCF, which is connected (possibly via an intermediate) to an eP-CSCF-2 as a terminating side eP-CSCF providing access for an WIC-2 as a terminating side WIC, and further illustrates signaling procedures for media plane optimizations.

What is not discussed so far in relation to the methods of FIGS. 11 and 12 is that a possible intermediate (e.g. interconnection border control function (IBCF) with attached transition gateway (TrGW) or multimedia resource function controller (MRFC) with attached multimedia function resource processor (MRFP)) may also insert a media gateway into the user plane (see step 4 of FIG. 13). Such an intermediate may optionally also support switching to the transparent media. This is required to allow the transparent media to be selected when its media gateway is present in the media path. Intermediates which do not support switching to the transparent media will be detected and will cause media2 to be selected in step 6 of FIG. 13.

Such possible intermediate may also apply optimal media routing (OMR) procedures to offer that its media gateway is bypassed by an optimised media path.

The intermediate may replace the transport address within the connection line in the SDP offer with the address IP3 allocated at its media gateway (step 5 of FIG. 13). If the intermediate supports switching to the transparent media, it may also modify the transparent media information encapsulated in SDP attribute(s) by replacing the encapsulated transport address with IP3 and the port information with P3t.

Further, the possible intermediate may reconfigure its MGW to transparently pass media3 (step 10 of FIG. 13.

In addition, the intermediate may forward the SDP answer with unmodified media3 and an indication that the transparent media have been selected, and may include address information IP7 of the controlled MGW (step 11 of FIG. 13).

As a result of the measures described above, according to exemplary embodiments of the present invention, the known procedures related to the field as discussed in the background section may be modified to read as follows:

WIC originating call:

If an eP-CSCF forwards an SDP offer from the WIC, and supports media plane optimization, and does not need to perform legal interception, then the eP-CSCF shall in addition to the SDP information, encapsulate the previously received SDP offer from the WIC. In order to do so, the eP-CSCF shall:

1) encapsulate each received session level SDP attribute into a "tra-att" attribute and add this attribute as a session level attribute,
2) encapsulate each received session-level bandwidth line into a "tra-bw" attribute and add this attribute as a session level attribute,
3) if the eP-CSCF decides to include a session level contact line in the SDP offer, include the address information as received from the eIMS-AGW in that contact line and also encapsulate the address information into a "tra-contact" attribute and add this attribute as a session level attribute,
4) provide the total number of media lines in the SDP offer the eP-CSCF forwards, excluding any media lines with port zero, in the "tra-media-line-number" attribute,
5) for each media line in the SDP offer sent on the Mw interface, encapsulate the TCP or UDP port as received from the eIMS-AGW to be used in the outgoing SDP offer for the media line into a "tra-port" attribute and add this attribute as a media level attribute for the media line,
6) for all media lines in the SDP offer sent on the Mw interface that relate to media stream(s) that are transported within data channel(s) within the same SCTP association between the eP-CSCF and the WIC, provide the "tra-SCTP-association" SDP attribute with a number designating the SCTP association that shall be assigned by the eP-CSCF and that shall be unique within the related SIP dialogue,
7) for each media line in the SDP offer sent on the Mw interface that does not relate to a data channel, encapsulate each received media level attribute of the corresponding received media line into a "tra-att" attribute", and add this attribute as a media level attribute for the media line,
8) for each media line in the SDP offer sent on the Mw interface that is the first media line within the SDP offer that relates to a data channel within one SCTP association, encapsulate each received media level attribute of the corresponding received media line, except for "dcmap" and "dcsa" attributes corresponding to media streams described in different media lines on the Mw interface, into a "tra-att" attribute", and add this attribute as a media level attribute for the media line,
9) for each media line in the SDP offer sent on the Mw interface that is a subsequent media line within the SDP offer that relates to a data channel within one SCTP association, encapsulate each received "dcmap" and "dcsa" media level attribute of the corresponding received media line corresponding to the media stream described in this media lines on the Mw interface, into a "tra-att" attribute", and add this attribute as a media level attribute for this media line, and
10) for each media line in the SDP offer sent on the Mw interface that does not relate to a data channel or that is the first media line within the SDP offer that relates to a data channel within one SCTP association:
   a) if the eP-CSCF decides to include a media level contact line in the SDP offer, include the address information as received from the eIMS-AGW in that contact line and also encapsulate the address information into a "tra-contact" attribute and add this attribute as a media level attribute for the media line,
   b) encapsulate the corresponding received media line into a "tra-m-line" attribute and add this attribute as a media level attribute for the media line, and
   c) encapsulate each received bandwidth line for the corresponding received media line into a "tra-bw" attribute, and add this as a media level attribute for the media line.

When interacting with the eIMS-AGW to reserve resources and provide the information needed for media handling, the eP-CSCF will ask for resources suitable for the media described in the SDP offer outside the "tra-m-line", "tra-att" and "tra-bw" SDP attributes.

If an ePCSCF receives an SDP answer over Mw interface and the SDP answer includes "tra-m-line" media level SDP attributes, the eP-CSCF shall:

1) when invoking the IMS-ALG procedures, use the media information received in "tra-contact", "tra-m-line", "tra-port", "tra-att", and "tra-bw" SDP attributes,
2) remove all received SDP attributes and bandwidth lines from the forwarded SDP answer (this also includes the "tra-contact", "tra-m-line", "tra-port", "tra-att", "tra-SCTP-association", "tra-media-line-number" and "tra-bw" SDP attributes),
3) de-encapsulate any SDP attributes received within session level "tra-att" SDP attributes and provide them as session level attributes in the SDP answer towards the WIC,
4) de-encapsulate any bandwidth lines received within session level "tra-bw" SDP attributes and provide them as session level bandwidth lines in the SDP answer towards the WIC,
5) for all media lines marked to belong to the same SCTP association by the "tra-SCTP-association" media level SDP attribute, provide a single media line in the SDP answer sent towards the WIC,
6) for each media line in the SDP answer sent towards the WIC:
   a) de-encapsulate the media line received within the "tra-m-line" SDP attribute and provide it as media line in the SDP answer towards the WIC, replacing the port number with the port allocated by its eIMS-AGW,
   b) de-encapsulate any media level SDP attributes received within "tra-att" SDP attributes for the corresponding media line and provide them as media level attributes for the media line in the SDP answer towards the WIC, and
   c) de-encapsulate any media level bandwidth lines received within "tra-bw" SDP attributes for the corresponding media line and provide them as media level bandwidth line for the media line in the SDP answer towards the WIC, and 7) use the so generated SDP answer to invoke IMS-ALG procedures.

When interacting with eIMS-AGW the eP-CSCF will deactivate media plane interworking in the eIMS-AGW. The eP-CSCF will use the "tra-SCTP-association" SDP attributes to determine which media streams need to be multiplexed into the same SCTP association.

WIC terminating call:

If an eP-CSCF receives an SDP offer over the Mw interface and the eP-CSCF supports media plane optimization, then the eP-CSCF shall determine for each media line whether media plane optimization is to be applied. Media plane optimization is to be applied when all of the following conditions are met:

1) the eP-SCSCF forwards the SDP offer towards a WIC,
2) the eP-SCSF does not need to perform legal interception,
3) for each media line, a "tra-port", and either a "tra-m-line" or a "tra-SCTP-association" media level SDP attribute have been received,
4) if a session level contact line is included in the received SDP, a "tra-contact" session level SDP attribute is also included in the received in the SDP, and the "contact-line" is the same as encapsulated within the "tra-contact" attribute,
5) if a media level contact line is included in the received SDP for any media line, a "tra-contact" media level SDP attribute is also included in the received in the SDP for that media line, and the "contact-line" is the same as encapsulated within the "tra-contact" attribute,
6) for each received media line, the port value in the m-line is the same as within the media level "tra-port" attribute for that media line, and
7) a "tra-media-line-number" SDP attribute is included in the received SDP offer and the number in the received "tra-media-line-number" SDP attribute matches the real number of media lines in the SDP, excluding any media lines with port zero.

If media plane optimization is to be applied, then the eP-CSCF shall:

1) when invoking the IMS-ALG procedures, use the media information received in "tra-contact", "tra-m-line", "tra-port", "tra-att", "tra-SCTP-association" and "tra-bw" SDP attributes (When interacting with eIMS-AGW, the eP-CSCF will deactivate media plane interworking in the eIMS-AGW. The eP-CSCF will use the "tra-SCTP-association" SDP attribute to determine which media streams need to be multiplexed into the same SCTP association.),
2) remove all received SDP attributes and bandwidth lines from the forwarded SDP offer (This also includes the "tra-contact", "tra-m-line", "tra-port", "tra-att", "tra-SCTP-association", "tra-media-line-number" and "tra-bw" SDP attributes.),
3) de-encapsulate any SDP attributes received within session level "tra-att" SDP attributes and provide them as session level attributes in the SDP offer towards the WIC,
4) de-encapsulate any bandwidth lines received within session level "tra-bw" SDP attributes and provide them as session level bandwidth lines in the SDP offer towards the WIC,
5) for all media lines marked to belong to the same SCTP association by the "tra-SCTP-association" media level SDP attribute, provide a single media line in the SDP offer sent towards the WIC, and
6) for each media line in the SDP offer sent towards the WIC:
   a) de-encapsulate the media line received within the "tra-m-line" SDP attribute and provide it as media line in the SDP offer towards the WIC, replacing the port number with the port allocated by its eIMS-AGW,
   b) de-encapsulate any media level SDP attributes received within "tra-att" SDP attributes for the corresponding media line and provide them as media level attributes for the media line in the SDP offer towards the WIC, and
   c) de-encapsulate any media level bandwidth lines received within "tra-bw" SDP attributes for the corresponding media line and provide them as media level bandwidth line for the media line in the SDP offer towards the WIC.

If media plane optimization is not to be applied, then the eP-CSCF shall:

1) remove all received the "tra-contact", "tra-m-line", "tra-port", "tra-att", "tra-SCTP-association", "tra-media-line-number" and "tra-bw" SDP attributes from the forwarded SDP offer,
2) when invoking the IMS-ALG procedures, use the media information received outside "tra-contact", "tra-m-line", "tra-port", "tra-att", "tra-SCTP-association" and "tra-bw" SDP attributes, and
3) not include any "tra-contact", "tra-m-line", "tra-port", "tra-att", "tra-SCTP-association", "tra-media-line-number" and "tra-bw" SDP attributes in the SDP answer over the Mw interface.

If the eP-CSCF receives an SDP answer from the WIC and the eP-CSCF decided to apply media plane optimization when processing the corresponding SDP offer, then the eP-CSCF shall:

1) generate an SDP answer based on the related SDP offer and the SDP answer received from the WIC (The selected formats of the answer need to be compliant with the offered formats. Media lines are disabled via port 0 if the corresponding media lines are disabled in the answer from the WIC. If data channels within one SCTP association are offered via dcmap attributes, the WIC can reject a data channel by excluding the corresponding dcmap attribute from the answer. The eP-CSCF then disables the media line, where the corresponding "tra-att:dcmap" attribute has been received in the SDP offer.),
2) encapsulate each received session level SDP attribute into a "tra-att" attribute and add this attribute as a session level attribute,
3) encapsulate each received session-level bandwidth line into a "tra-bw" attribute and add this attribute as a session level attribute, and
4) for all media line in the SDP answer sent on the Mw interface that relate to media stream(s) that are transported within the data channels within the same SCTP association between the eP-CSCF and the WIC, provide the "tra-SCTP-association" SDP attribute with a number designating the SCTP association that shall be the same as received for the corresponding media line in the SDP offer on the Mw interface, and
5) for each media line in the SDP answer sent on the Mw interface that does not relate to a data channel, encapsulate each received media level attribute of the corresponding received media line into a "tra-att" attribute", and add this attribute as a media level attribute for the media line 6) for each media line in the SDP answer sent on the Mw interface that is the first media line within the SDP answer that relates to a data channel within one SCTP association, encapsulate each received media level attribute of the corresponding received media line, except for "dcmap" and "dcsa" attributes corresponding to media streams described in different media lines on the Mw interface, into a "tra-att" attribute", and add this attribute as a media level attribute for the media line, 7) for each media line in the SDP answer sent on the Mw interface that is a subsequent media line within the SDP answer that relates to a data channel within one SCTP association, encapsulate each received "dcmap" and "dcsa" media level attribute of the corresponding received media line corresponding to the media stream described in this media lines on the Mw interface, into a "tra-att" attribute", and add this attribute as a media level attribute for this media line, and 8) for each media line in the SDP answer sent on the Mw interface that does not relate to a data channel or that is the first media line within the SDP answer that relates to a data channel within one SCTP association:
   a) encapsulate the corresponding received media line into a "tra-m-line" attribute and add this attribute as a media level attribute for the media line, and
   b) encapsulate each received bandwidth line for the corresponding received media line within into a "tra-bw" attribute, and add this as a media level attribute for the media line.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 14:
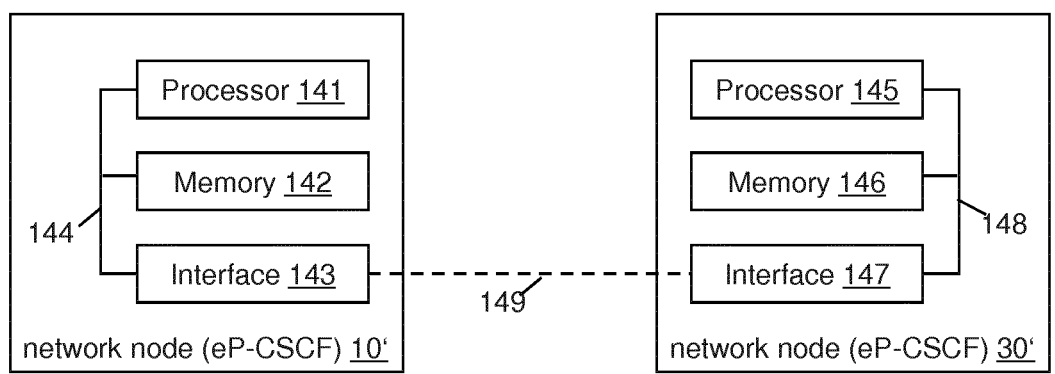
FIG. 14 is a block diagram alternatively illustrating apparatuses according to exemplary embodiments of the present invention.
Figure 15:
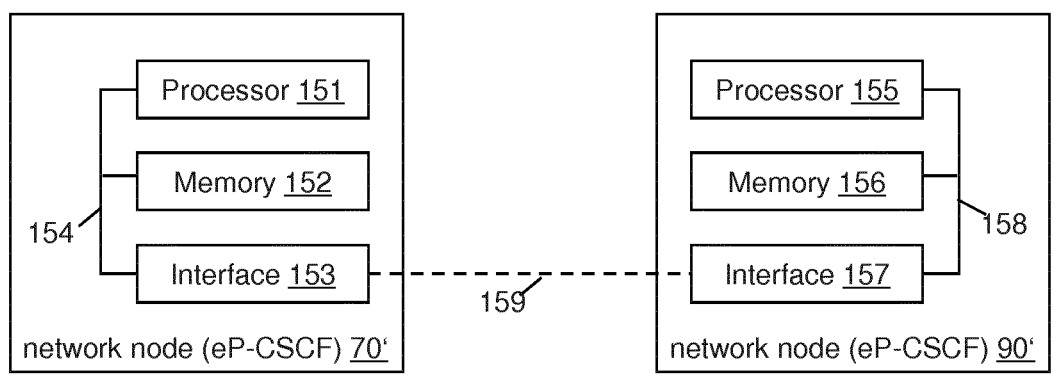
FIG. 15 is a block diagram alternatively illustrating apparatuses according to exemplary embodiments of the present invention.

In FIGS. 14 and 15, an alternative illustration of apparatuses according to exemplary embodiments of the present invention is depicted. As indicated in FIG. 14, according to exemplary embodiments of the present invention, the apparatus (network node) 10' (corresponding to the network node 10) comprises a processor 141, a memory 142 and an interface 143, which are connected by a bus 144 or the like. Further, according to exemplary embodiments of the present invention, the apparatus (network node) 30' (corresponding to the network node 30) comprises a processor 145, a memory 146 and an interface 147, which are connected by a bus 148 or the like, and the apparatuses may be connected via link 149, respectively. As indicated in FIG. 15, according to exemplary embodiments of the present invention, the apparatus (network node) 70' (corresponding to the network node 70) comprises a processor 151, a memory 152 and an interface 153, which are connected by a bus 154 or the like. Further, according to exemplary embodiments of the present invention, the apparatus (network node) 90' (corresponding to the network node 90) comprises a processor 155, a memory 156 and an interface 157, which are connected by a bus 158 or the like, and the apparatuses may be connected via link 159, respectively.

The processor 141/145/151/155 and/or the interface 143/147/153/157 may also include a modem or the like to facilitate communication over a (hardwire or wireless) link, respectively. The interface 143/147/153/157 may include a suitable transceiver coupled to one or more antennas or communication means for (hardwire or wireless) communications with the linked or connected device(s), respectively. The interface 143/147/153/157 is generally configured to communicate with at least one other apparatus, i.e. the interface thereof.

The memory 142/146/152/156 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 comprises at least one processor 141, at least one memory 142 including computer program code, and at least one interface 143 configured for communication with at least another apparatus. The processor (i.e. the at least one processor 141, with the at least one memory 142 and the computer program code) is configured to perform receiving a first session description message comprising at least one media line indicative of multiple media streams transportable in a same stream control association (thus the apparatus comprising corresponding means for receiving), and to perform generating, based on said first session description message, a second session description message indicative of a possibility for a separate transport of said multiple media streams and of a possibility for a joint transport of at least some media streams of said multiple media streams in the same stream control association (thus the apparatus comprising corresponding means for generating).

Further, according to exemplary embodiments of the present invention, an apparatus representing the network node 30 comprises at least one processor 145, at least one memory 146 including computer program code, and at least one interface 147 configured for communication with at least another apparatus. The processor (i.e. the at least one processor 145, with the at least one memory 146 and the computer program code) is configured to perform receiving a first session description message comprising one media line per each media stream and an indication of a possibility for a joint transport of at least some media streams of multiple media streams in a same stream control association (thus the apparatus comprising corresponding means for receiving), and to perform generating, based on said first session description message, a second session description message comprising at least one media line indicative the said joint transport of the of said at least some media streams in said same stream control association (thus the apparatus comprising corresponding means for generating).

Further, according to exemplary embodiments of the present invention, an apparatus representing the network node 70 comprises at least one processor 151, at least one memory 152 including computer program code, and at least one interface 153 configured for communication with at least another apparatus. The processor (i.e. the at least one processor 151, with the at least one memory 152 and the computer program code) is configured to perform receiving a first session description message indicative of at least one media stream to be transported with a first transport and encoding (thus the apparatus comprising corresponding means for receiving), to perform generating, based on said first session description message, a second session description message comprising for each of said at least one media streams one media line indicative of said that media stream to be transported with a second transport and encoding, and at least one encapsulating attribute which is indicative of the alternative possibility of said first transport and encoding (thus the apparatus comprising corresponding means for generating), and to perform adding, to said second session description message, media line number information indicative of a total number of said at least one media line in said second session description message (thus the apparatus comprising corresponding means for adding).

Further, according to exemplary embodiments of the present invention, an apparatus representing the network node 90 comprises at least one processor 155, at least one memory 156 including computer program code, and at least one interface 157 configured for communication with at least another apparatus. The processor (i.e. the at least one processor 155, with the at least one memory 156 and the computer program code) is configured to perform receiving a session description message comprising at least one media line indicative of at least one media stream to be transported with a first transport and encoding, at least one encapsulating attribute which is indicative of the alternative possibility of a first transport and encoding, and media line number information indicative of a total number of said at least one media line in said session description message as originally generated (thus the apparatus comprising corresponding means for receiving), and to perform deciding, based on said media line number information, whether to utilize said first transport and encoding transportation of each of said at least one media stream corresponding to each of said at least one media line (thus the apparatus comprising corresponding means for deciding).

For further details regarding the operability/functionality of the individual apparatuses, reference is made to the above description in connection with any one of FIGS. 1 to 13, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enhanced media plane optimization in web real time communication scenarios. Such measures exemplarily comprise receiving a first session description message comprising at least one media line indicative of multiple media streams transportable in a same stream control association, and generating, based on said first session description message, a second session description message indicative of a possibility for a separate transport of said multiple media streams and of a possibility for a joint transport of at least some media streams of said multiple media streams in the same stream control association.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3$^{rd}$ generation Partnership Project
DCEP data channel establishment protocol
eIMS-AGW enhanced IMS access gateway
eP-CSCF enhanced proxy call session control function
IBCF interconnection border control function
IMS IP multimedia subsystem
IMS-ALG IMS application level gateway
IP internet protocol
MRFP multimedia function resource processor
MRFC multimedia resource function controller
OMR optimal media routing
SCTP stream control transmission protocol
SDP session description protocol
SIP session initiation protocol
TCP transmission control protocol
TrGW transition gateway
TS technical specification
UDP user datagram protocol
WebRTC web real-time communication
WIC WebRTC IMS client

The invention claimed is:

1. An apparatus, comprising:
at least one processor,
at least one memory including computer program code, and
at least one interface configured for communication with at least another apparatus,
the at least one processor, with the at least one memory and the computer program code, being configured to cause the apparatus to perform:
receiving a first session description message indicative of at least one media stream to be transported with a first media transport and encoding,
generating a second session description message comprising:
  for each of said at least one media stream a media line indicating that said media stream is to be transported with a second media transport and encoding, and
  at least one encapsulating attribute which is indicative of the alternative possibility of each of said at least one media stream to be transported with said first media transport and encoding, and
  adding, to said second session description message, media line number information indicative of a total number of said at least one media line in said second session description message, wherein said first media transport and encoding is not utilized if a comparison of a result of counting each media line in said second session description message does not match the total number of said at least one media line indicated by the media line number information.

2. The apparatus according to claim 1, wherein
the at least one processor, with the at least one memory and the computer program code, being configured to cause the apparatus to perform:
transmitting said second session description message.

3. The apparatus according to claim 1, wherein
the apparatus is operable as or at an enhanced proxy call session control function node of a cellular system, or
the apparatus is operable in at least one of a LTE and a LTE-A cellular system, or
said first session description message is one of a session description protocol offer or a session description protocol answer, or
said second session description message is one of a session description protocol offer or a session description protocol answer, or
said session description message is one of a session description protocol offer or a session description protocol answer, or
said transportation is a transparent transport of media streams.

4. An apparatus, comprising:
at least one processor,
at least one memory including computer program code, and
at least one interface configured for communication with at least another apparatus,
the at least one processor, with the at least one memory and the computer program code, being configured to cause the apparatus to perform:
receiving a session description message comprising:
  at least one media line indicative of at least one media stream to be transported with a second media transport and encoding,
  at least one encapsulating attribute which is indicative of the alternative possibility of each of said at least one media stream to be transported with a first media transport and encoding, and media line number information indicative of a total number of said at least one media line in said session description message as originally generated, and deciding whether to utilize said first media transport and encoding for transportation of said at least one media stream corresponding to said at least one media line, wherein it is decided not to utilize said first media transport and encoding for transportation of said at least one media stream corresponding to said at least one media line if a result of counting each media line in said received session description message and said total number of said at least one media line in said session description message as originally generated, as derived from said media line number information, do not match.

5. The apparatus according to claim 4, wherein the at least one processor, with the at least one memory and the computer program code, being configured to cause the apparatus to perform:

counting each media line in said received session description message, comparing a result of said counting and said total number of said at least one media line in said session description message as originally generated, as derived from said media line number information, wherein if said result of said counting and said total number of each of said at least one media line in said session description message as originally generated, as derived from said media line number information, do not match, it is decided not to utilize said first transport and encoding for transportation of each of said at least one media stream corresponding to each of said at least one media line.

6. The apparatus according to claim 4, wherein the at least one processor, with the at least one memory and the computer program code, being configured to:

if said media line number information is absent from said received session description message, it is decided not to utilize said first transport and encoding for transportation of each of said at least one media stream corresponding to each of said at least one media line.

* * * * *